July 22, 1924.
R. L. WELLS ET AL
1,502,612
PLANT PICKER
Filed June 22, 1922
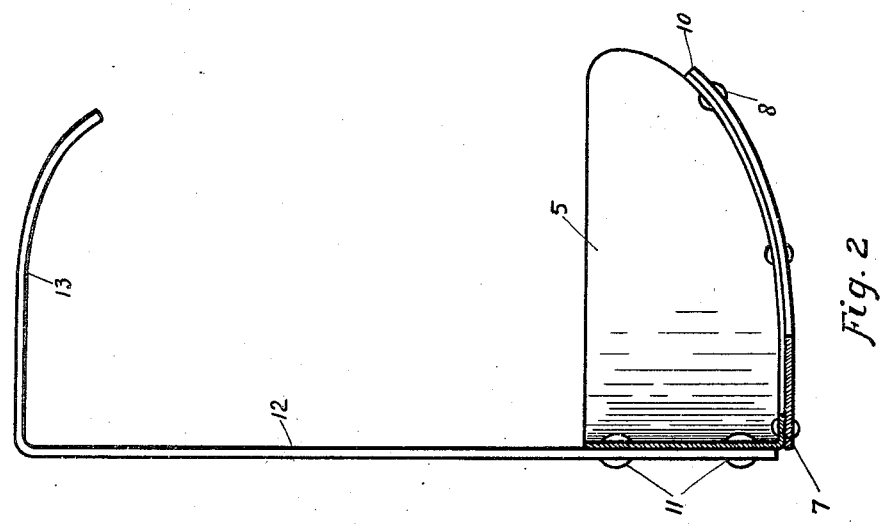
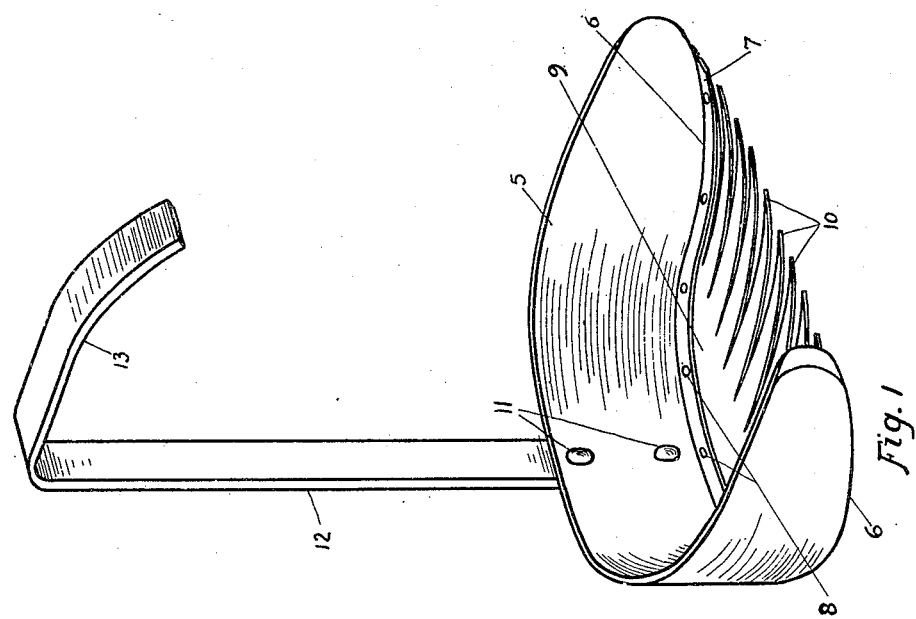
Witnesses:
D. Millenaar
H. S. Weidman
Inventors
Robert L. Wells
Frank Buckner
By Joshua R H Pike
Their Attorney.

Patented July 22, 1924.

1,502,612

UNITED STATES PATENT OFFICE.

ROBERT L. WELLS AND FRANK BUCKNER, OF CHICAGO, ILLINOIS.

PLANT PICKER.

Application filed June 22, 1922. Serial No. 570,240.

*To all whom it may concern:*

Be it known that we, ROBERT L. WELLS and FRANK BUCKNER, citizens of the United States, and residents of the city of Chicago, county of Cook, and State of Illinois, have invented certain new and useful Improvements in Plant Pickers, of which the following is a specification.

This invention relates to plant pickers, and has for its object the provision of a device of this character having means for grasping the plants beneath the heads or blossoms thereof, severing the blossoms from their stems, and collecting such blossoms at the same time not injuring grass or smaller plants growing in the vicinity of such plants.

Other objects will appear hereinafter.

The invention consists in the combinations and arrangements of parts hereinafter described and claimed.

The invention will be best understood by reference to the accompanying drawings forming a part of this specification, and in which, Fig. 1 is a perspective view of the invention; and Fig. 2 is a side view of the invention partly in elevation, and partly in section.

The device herein described is particularly designed for gathering a plurality of dandelion blossoms at one time, for food or otherwise, by severing the blossoms from their stems, without injury to the turf in which they grow, and without damaging unheaded plants growing in the vicinity thereof.

The invention comprises a substantially scoop-shaped receptacle, having a curved wall 5, which has its bottom edges upwardly tapered as shown at 6. The lower edge of the wall 5 is preferably inwardly turned so as to form a flange 7 thereon, and preferably secured to the flange 7 by means of rivets 8 or other suitable fastening means is a plate 9, which is preferably curved to conform with the curvature of the bottom edge of the wall 5. The plate 9 is provided with a plurality of curved teeth 10, having comparatively sharp outer ends, and increasing in width rearwardly, so that such teeth meet at their inner ends as shown, preferably at a point some distance from the adjacent wall 5. Preferably secured to the wall 5 of the scoop by rivets 11 or other suitable fastening means, is an upright 12, the upper end of which is preferably inwardly and downwardly curved as shown at 13 so that same is disposed above the scoop in such manner that when the handle is grasped near its end the scoop is off-center with respect thereto and when swung backwardly, the weight of the scoop aids in forward swinging motion thereof.

In operation the handle 13 is grasped in such manner that the scoop is easily swung thereby. The scoop is then swung downwardly and forwardly beneath the blossoms of the plants, the stems of which are severed by the converging sides of the teeth 10, the blossoms being retained in the scoop formed by the wall 5 and the plate 9 after severance.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having described our invention, what we claim as new and desire to secure by Letters Patent is:

1. A device for severing and collecting the heads of plants, such device including a scoop with side and rear walls and an attaching flange, and a plate secured to said flange and having integral upwardly curved teeth spaced at their outer ends and converging toward their inner ends, and handle means to swing said scoop beneath the heads of said plants for severing them from their stems.

2. A device for severing and collecting the heads of plants, such device including a scoop with side and rear walls and a plate thereon having integral teeth spaced at their outer ends and converging toward their inner ends, and handle means extending upwardly from said walls and overhanging said teeth for swinging said scoop.

3. A device for severing and collecting the heads of plants, such device including a scoop having a curved wall open at the front and an inwardly turned flange on the lower edge of said wall; a metallic plate secured to said flange, said plate having teeth formed therein spaced at their outer ends and converging toward their inner ends, and handle means fastened to the rear wall of said scoop for swinging said scoop, such means overhanging said teeth.

4. A device for severing and collecting the heads of plants, such device including a scoop comprising a wall open at the front and having its lower edges outwardly tapered; an inwardly turned flange upon the lower edge of said wall; a curved plate secured to said flange, said plate having integral teeth formed therein spaced at their outer ends and converging toward their inner ends; and handle means fastened a distance rearward of said teeth for swinging said scoop, such means overhanging said teeth.

In testimony whereof we have signed our names to this specification in the presence of two subscribing witnesses.

FRANK BUCKNER.
ROBERT L. WELLS.

Witnesses:
E. F. CLINE,
W. C. WEIGAND.